US010654065B2

(12) United States Patent
Lopez et al.

(10) Patent No.: US 10,654,065 B2
(45) Date of Patent: May 19, 2020

(54) CLEANING FIXTURES AND METHODS OF CLEANING COMPONENTS USING CLEANING FIXTURES

(71) Applicant: General Electric Company, Schenectady, NY (US)

(72) Inventors: Jose Troitino Lopez, Greenville, SC (US); Raymond Michael Brown, Greer, SC (US)

(73) Assignee: General Electric Company, Schenectady, NY (US)

( * ) Notice: Subject to any disclaimer, the term of this patent is extended or adjusted under 35 U.S.C. 154(b) by 242 days.

(21) Appl. No.: 15/675,174

(22) Filed: Aug. 11, 2017

(65) Prior Publication Data

US 2019/0047008 A1 Feb. 14, 2019

(51) Int. Cl.

*B05B 15/55* (2018.01)
*B05B 7/32* (2006.01)
*B01F 5/04* (2006.01)

(Continued)

(52) U.S. Cl.

CPC .......... *B05B 15/557* (2018.02); *B01F 5/0403* (2013.01); *B05B 7/32* (2013.01);

(Continued)

(58) Field of Classification Search

CPC ......... B05B 15/557; B05B 7/32; B05B 12/14; B29C 64/35; B33Y 30/00; B33Y 40/00; G02C 13/008; G04D 3/08; B08B 5/02

See application file for complete search history.

(56) References Cited

U.S. PATENT DOCUMENTS 3,697,420 A 10/1972 Blaisdell et al.
5,213,117 A * 5/1993 Yamamoto .............. B08B 3/006 134/58 R (Continued)

FOREIGN PATENT DOCUMENTS

| | | | |
|---|---|---|---|
| EP | 0288728 | B2 | 11/1995 |
| JP | 10311966 | A * | 11/1998 |
| WO | 94/11168 | | 5/1994 |
| WO | 2013/017144 | A1 | 2/2013 |

OTHER PUBLICATIONS

Machine translation: JP10311966 (Year: 1998).*

*Primary Examiner* — Mikhail Kornakov
*Assistant Examiner* — Natasha N Campbell
(74) *Attorney, Agent, or Firm* — James Pemrick; Hoffman Warnick LLC

(57) ABSTRACT

Cleaning fixtures for a component(s) are disclosed. The cleaning fixtures may include a first and second component recess configured to receive a first and second component, respectively. Each component recess may be defined between a first and second member of the cleaning fixture. The cleaning fixture may also include a first solvent conduit in fluid communication with the first component recess, and a second solvent conduit in fluid communication with the second component recess. The first and second solvent conduit may include physical characteristic(s) configured to control delivery of solvent into the respective component recess at desired fluid parameter(s). The cleaning fixture may also include a first gas conduit in fluid communication with the first component recess, and a second gas conduit in fluid communication with the second component recess. Each of the first and second gas conduit may deliver a pressurized gas to the respective component recess.

8 Claims, 12 Drawing Sheets

(51) Int. Cl.

| | |
|---|---|
| ***B29C 64/357*** | (2017.01) |
| ***B33Y 40/00*** | (2020.01) |
| ***B29C 64/35*** | (2017.01) |
| ***B22F 3/105*** | (2006.01) |
| ***B05B 12/14*** | (2006.01) |
| ***B33Y 30/00*** | (2015.01) |
| ***B08B 11/02*** | (2006.01) |

(52) U.S. Cl.

CPC ............ *B08B 11/02* (2013.01); *B29C 64/357* (2017.08); *B33Y 40/00* (2014.12); *B05B 12/14* (2013.01); *B22F 2003/1059* (2013.01); *B22F 2999/00* (2013.01); *B29C 64/35* (2017.08); *B33Y 30/00* (2014.12)

(56) References Cited

U.S. PATENT DOCUMENTS

| | | | | |
|---|---|---|---|---|
| 6,080,361 | A * | 6/2000 | Borovsky | A61L 12/02 134/10 |
| 7,556,490 | B2 | 7/2009 | Wicker et al. | |
| 8,185,229 | B2 | 5/2012 | Davidson | |
| 2004/0084814 | A1 | 5/2004 | Boyd et al. | |
| 2010/0200189 | A1 | 8/2010 | Qi et al. | |
| 2012/0107496 | A1 | 5/2012 | Thoma | |
| 2015/0258744 | A1 | 9/2015 | Muller et al. | |
| 2016/0003156 | A1 | 1/2016 | Hanson | |
| 2016/0236293 | A1 | 8/2016 | Chang et al. | |

* cited by examiner

CLEANING FIXTURES AND METHODS OF CLEANING COMPONENTS USING CLEANING FIXTURES

BACKGROUND OF THE INVENTION

The disclosure relates generally to cleaning fixtures for components, and more particularly, to cleaning fixtures for cleaning components using solvents and pressurized gases.

Additive manufacturing includes a wide variety of processes of producing an object through the successive layering and/or formation of material rather than the removal of material. Additive manufacturing can create complex geometries without the use of any sort of molds or fixtures, and with little or no waste material. Instead of machining objects from solid billets of material, much of which is cut away and discarded, the only material used in additive manufacturing is what is required to shape the object. One example of additive manufacturing is stereolithography, which utilizes photopolymerization to create components or parts from a resin material. Specifically, the stereolithography process utilizes a liquid resin material that is exposed to an energy source (e.g., light) which causes the exposed portions of the resin material to solidify, and form a polymer. In the stereolithography process, each layer of the component may be built before a platform adjusts the position of the built portion of the component to provide more resin material between the built portion of the component and the energy source. The resin material positioned there between may be utilized to form the next layer in the component.

Because additive manufacturing typically requires components to be surrounded by, exposed to, and/or layered with unprocessed material, finished or complete additive manufactured components often have excess, unprocessed material formed on surfaces and/or included in features. For example, components formed from stereolithography often include unprocessed resin material included on the surface and/or within features (e.g., channels) of the polymer-formed component. If not removed from the component, the unprocessed material may result in undesirable build effects on the component after performing post-processes. In stereolithography, the unprocessed resin material that may remain within a channel of the polymer-formed component may become partially-solidified and/or permanent when performing post-processes on the component (e.g., curing, heating, polishing and so on), which may result in partial or complete blockage of the channel within the component. Blockage of the channel may adversely affect the intended functionality and/or operation of the component built using stereolithography.

To remove the unprocessed material, components built using additive manufacturing processes often undergo a cleaning process. However, conventional cleaning processes are often ineffective; especially when components include complex geometries and/or features. The conventional process for cleaning components formed using stereolithography is to "rinse" or "soak" the polymer-formed component in a solvent-solution bath. That is, once the stereolithography component is formed, the component may be placed in a solvent-solution bath for a predetermined amount of time to remove any unprocessed resin material that may remain in and/or on the component. However, merely soaking the component in the solvent-solution bath is ineffective, and conventional stereolithography components often undergo post-processing without all of the unprocessed resin being removed.

BRIEF DESCRIPTION OF THE INVENTION

A first aspect of the disclosure provides a cleaning fixture for at least one component. The cleaning fixture includes: a first component recess configured to receive a first component therein and a second component recess configured to receive a second component therein, each component recess defined between a first member and a mating second member of the cleaning fixture; a first solvent conduit in fluid communication with the first component recess, and a second solvent conduit in fluid communication with the second component recess, the first solvent conduit and the second solvent conduit each including a physical characteristic configured to control delivery of a solvent into the respective component recess at a desired fluid parameter; and a first gas conduit in fluid communication with the first component recess, and a second gas conduit in fluid communication with the second component recess, each of the first gas conduit and the second gas conduit configured to deliver a respective pressurized gas to the respective component recess.

A second aspect of the disclosure provides a method of cleaning at least one component using a cleaning fixture. The method includes: releasably coupling a first member of the cleaning fixture to a second member of the cleaning fixture, the first member and the second member defining a first component recess for receiving a first component therein and a second component recess for receiving a second component therein; delivering a solvent at a desired fluid parameter to: the first component recess via a first solvent conduit in fluid communication with the first component recess, and the second component recess via a second solvent conduit in fluid communication with the second component recess; and delivering a pressurized gas to: the first component recess via a first gas conduit in fluid communication with the first component recess, and the second component recess via a second gas conduit in fluid communication with the second component recess.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within the disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

The following disclosure relates generally to cleaning fixtures for components, and more particularly, to cleaning fixtures for cleaning components using solvents and pressurized gases.

These and other embodiments are discussed below with reference to FIGS. 1-11. However, those skilled in the art will readily appreciate that the detailed description given herein with respect to these Figures is for explanatory purposes only and should not be construed as limiting.

Figure 1:
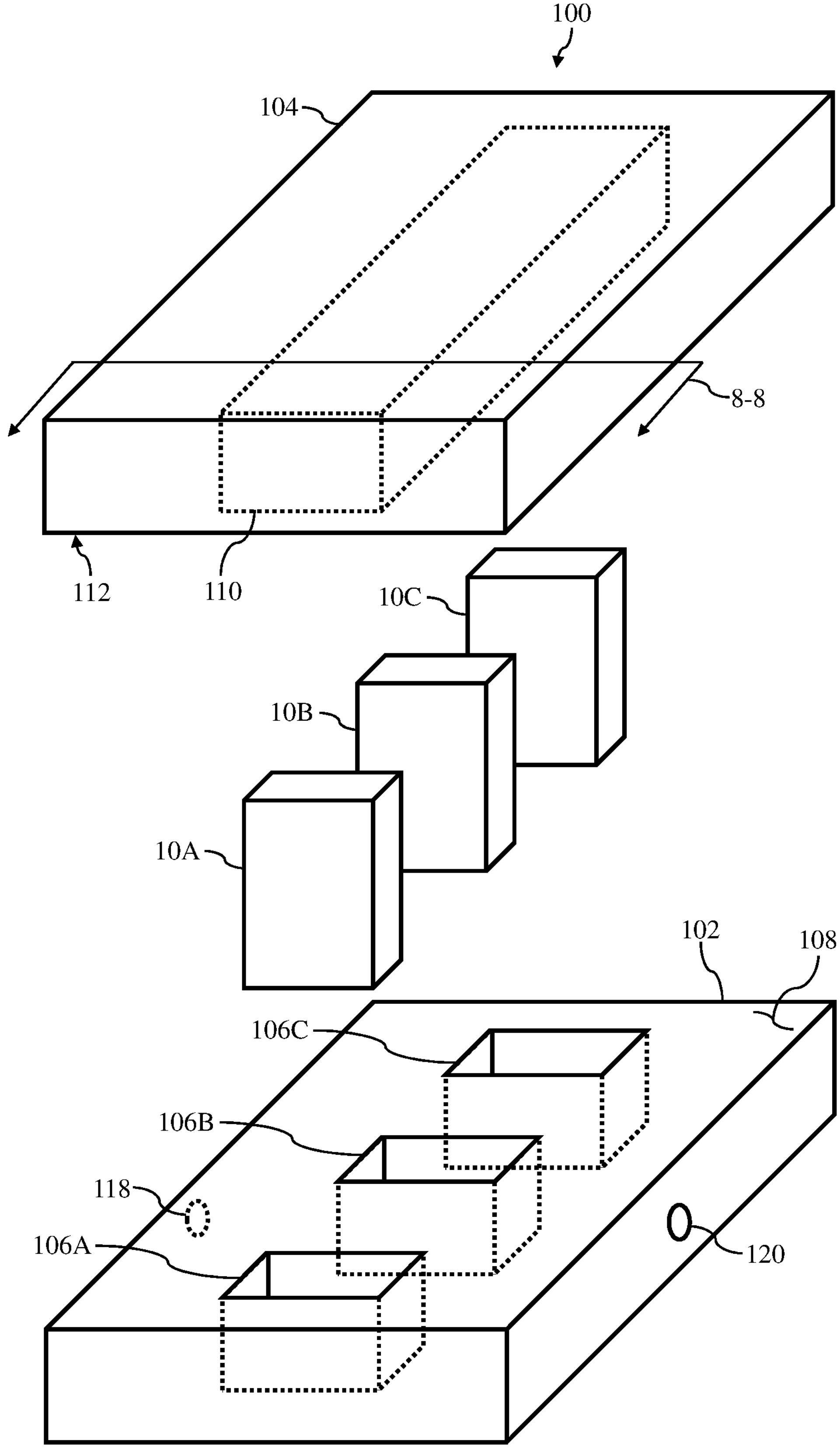
FIG. 1 shows an exploded perspective view of a cleaning fixture including a first member and a second member, and a plurality of components, according to embodiments of the disclosure.

FIG. 1 shows an exploded perspective view of a cleaning fixture. Specifically, FIG. 1 shows an exploded view of a cleaning fixture 100 that may receive at least one component 10A, 10B, 10C. As discussed herein, cleaning fixture 100 may be utilized to clean at least one component 10A, 10B, 10C, and more specifically the plurality of components 10A, 10B, 10C, by removing build material/debris, prior to use of the plurality of components 10A, 10B, 10C, and/or prior to performing post-build processes (e.g., etching, polishing, coating, and so on) on the plurality of components 10A, 10B, 10C. The plurality of components 10A, 10B, 10C may be any component build or manufactured that may require cleaning and/or a "bath" prior to being utilized and/or prior to performing post-build processes. In non-limiting examples, the plurality of components 10A, 10B, 10C may be components formed using additive manufacturing processes and/or techniques including, but not limited to, 3D printing, multi-jet modeling, stereolithography, selective laser sintering, fused deposition modeling, and so on. It is understood that the number of components 10A, 10B, 10C shown in FIG. 1 that may be cleaned by cleaning fixture 100 are merely illustrative. As such, the number of components 10A, 10B, 10C cleaning fixture 100 may be configured to clean more or less components 10A, 10B, 10C at a time than the number depicted in FIG. 1. Additionally, and as discussed herein, the number of components 10A, 10B, 10C that may be cleaned using cleaning fixture 100 may be dependent, at least in part, on the features of cleaning fixture 100.

As shown in FIG. 1, cleaning fixture 100 may include a first member 102 and a second member 104 positioned substantially above first member 102. First member 102 and second member 104 may be configured to be releasably coupled to one another. That is, and as discussed herein, when cleaning the plurality of components 10A, 10B, 10C, first member 102 may be releasably coupled to second member 104; and vice versa. First member 102 and second member 104 may be releasably coupled to one another using any suitable coupling mechanism and/or coupling technique. In non-limiting examples, first member 102 and second member 104 may be coupled by being fastened, screwed, latched, compression-fit, temporarily adhered, magnetically attracted, or coupled together using any other similar coupling mechanism/technique. First member 102 and second member 104 may be formed from any suitable material and/or materials that may be capable of receiving and/or supporting the plurality of components 10A, 10B, 10C during the cleaning process, as discussed herein. In non-limiting examples, first member 102 and second member 104 may be formed from polymer, ceramic, metal, metal alloys and the like.

Cleaning fixture 100 may also include a plurality of component recesses 106A, 106B, 106C formed therein. Specifically, first member 102 and/or second member 104 of cleaning fixture 100 may define a plurality of component recesses 106A, 106B, 106C and/or features that may be configured to receive the plurality of components 10A, 10B, 10C. In the non-limiting example shown in FIG. 1, first member 102 may include a plurality of component recess 106A, 106B, 106C formed into and/or through a top surface 108 of first member 102. Component recesses 106A, 106B, 106C may extend partially through first member 102 to receive at least a portion of the plurality of components 10A, 10B, 10C. That is, each one of the plurality of component recesses 106A, 106B, 106C formed in and extending partially through first member 102 may receive and substantially surround at least a portion of one of the plurality of components 10A, 10B, 10C. For example, a first component recesses 106A may receive a first component 10A, a second component 106B may receive a second component 10B, and a third component 106C may receive a third component 10C. The plurality of component recesses 106A, 106B, 106C formed in first member 102 may include a geometry corresponding to the geometry of the plurality of component 10A, 10B, 10C. As such a substantially uniform and/or desired gap or space between component recesses 106A, 106B, 106C and the plurality of components 10A, 10B, 10C may be achieved and/or maintained during the cleaning process discussed herein.

Although three distinct component recesses 106A, 106B, 106C are formed in first member 102 of cleaning fixture 100, it is understood that the number of component recesses 106A, 106B, 106C shown in FIG. 1 are merely illustrative. As such, the number of component recesses 106A, 106B, 106C of cleaning fixture 100 may be more or less than the number depicted in FIG. 1. The number of component recesses 106A, 106B, 106C formed in cleaning fixture 100 may be dependent on a variety of factors. In non-limiting examples, the number of component recesses 106A, 106B, 106C of cleaning fixture 100 may be dependent, at least in part, on: the size of the plurality of components 10A, 10B, 10C, the geometry of the plurality of components 10A, 10B, 10C, features (e.g., internal cavities, through holes, and so on) of the plurality of components 10A, 10B, 10C, and so on.

As shown in the non-limiting example of FIG. 1, second member 104 may also include at least one cavity 110 configured to receive at least a portion of the plurality of components 10A, 10B, 10C. That is, where the plurality of component recesses 106A, 106B, 106C formed in first member 102 may only receive a portion of each of the plurality of components 10A, 10B, 10C, second member 104 may include cavity 110 formed in and/or partially through a bottom surface 112. Cavity 110 of second member 104 may be substantially aligned with and/or may substantially cover each of the plurality of component recesses 106A, 106B, 106C. As such, the portions of each of the plurality of components 10A, 10B, 10C that extend out of the corresponding component recess 106A, 106B, 106C formed in first member 102 may be received, positioned within and/or substantially surrounded by cavity 110 formed in second member 104. When first member 102 and second member 104 are releasably coupled, the plurality of component recesses 106A, 106B, 106C of first member 102 and cavity 110 of second member 104 may form a chamber or pocket (see, FIG. 8) that may receive and/or house the plurality of components 10A, 10B, 10C during the cleaning process, as discussed herein.

In the non-limiting example shown in FIG. 1, cavity 110 may include a simple geometry that may be capable of surrounding each of the plurality of components 10A, 10B, 10C positioned within the plurality of component recess 106A, 106B, 106C and cavity 110, respectively. That is, cavity 110 may not include a unique geometry that may correspond to the geometry of the plurality of components 10A, 10B, 10C. In another non-limiting example, cavity 110 may include a geometry that may at least partially correspond to the geometry of the plurality of component 10A, 10B, 10C. Additionally as shown in FIG. 1, second member 104 may include only a single cavity 110. However, in other non-limiting examples, second member 104 may include a plurality of cavities 110 (see, FIG. 10B), where each of the plurality of cavities 110 is aligned with and corresponds to one of the plurality of component recesses 106A, 106B, 106C.

As shown in FIG. 1, and as discussed herein in detail, cleaning fixture 100 may also include a plurality of fluid inlets or manifolds. That is, and as discussed herein, cleaning fixture 100 may include a solvent inlet or manifold 118 (hereafter, "solvent manifold 118")(shown in phantom) formed in and/or through first member 102, and a gas inlet or manifold 120 (hereafter, "gas manifold 120") formed in and/or through first member 102, opposite solvent manifold 118. Solvent manifold 118 and gas manifold 120 may be in fluid communication with each of the plurality of component recesses 106A, 106B, 106C for providing fluids when performing the cleaning process on component 10A, 10B, 10C using cleaning fixture 100, as discussed herein.

Figure 2:
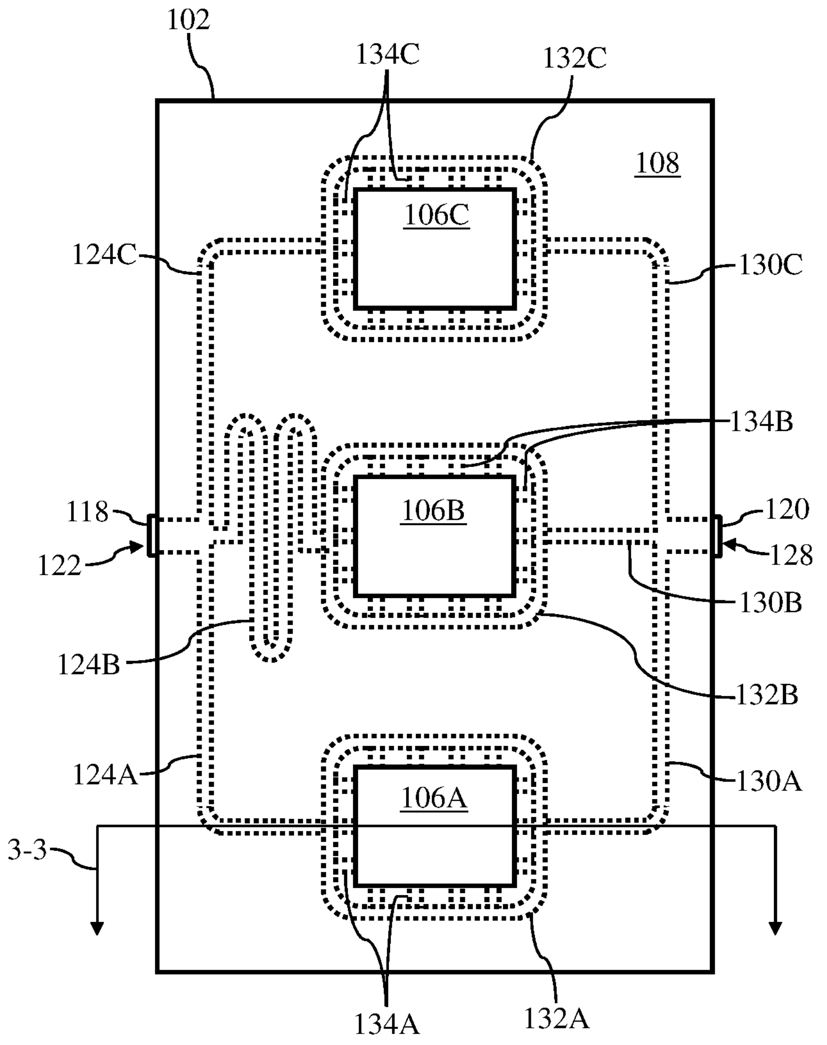
FIG. 2 shows a top view of the first member of the cleaning fixture of FIG. 1, according to embodiments of the disclosure.
Figure 3:
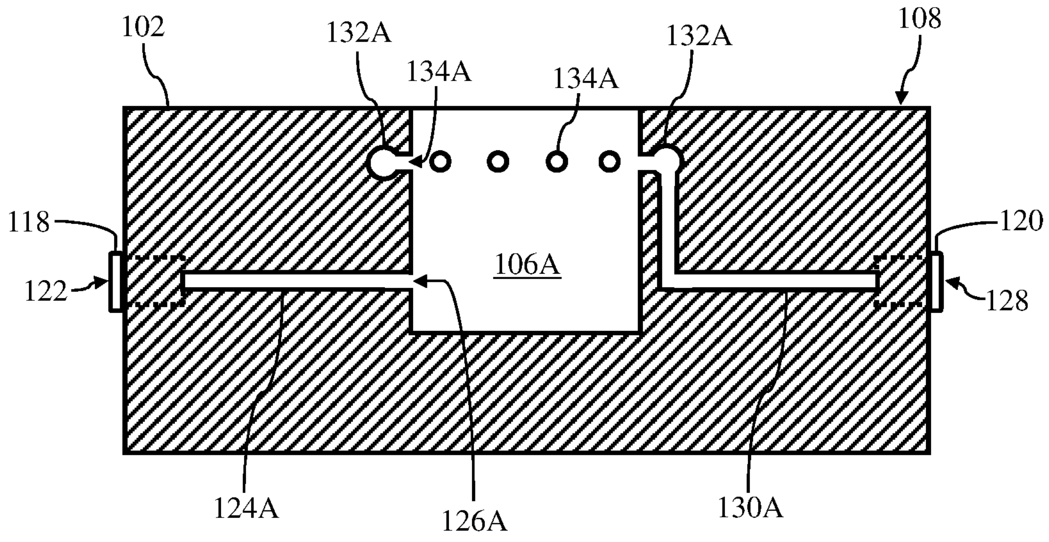
FIG. 3 shows a front cross-sectional view of the first member of the cleaning fixture of FIG. 2, taken along line 3-3, according to embodiments of the disclosure.
Figure 4:
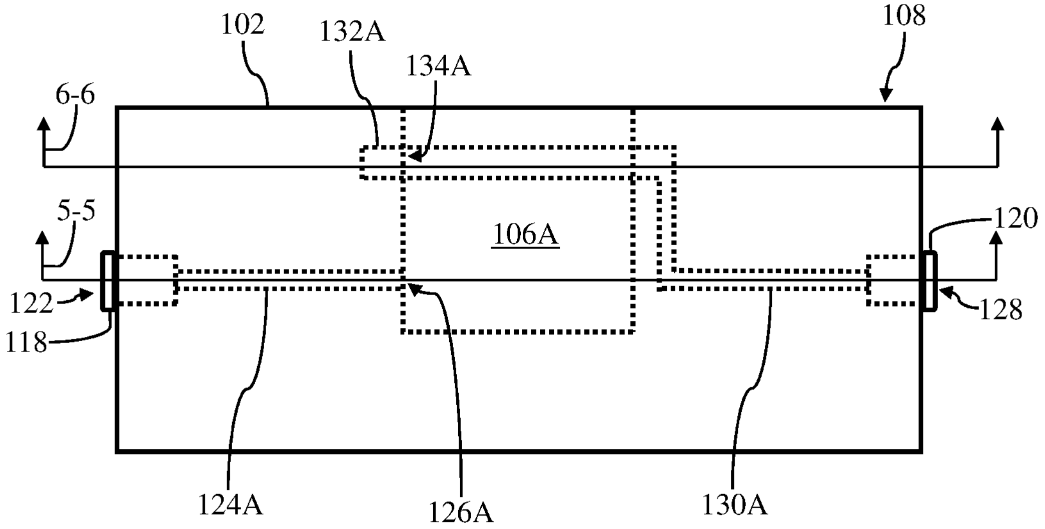
FIG. 4 shows a front view of the first member of the cleaning fixture of FIG. 2, according to embodiments of the disclosure.
Figure 5:
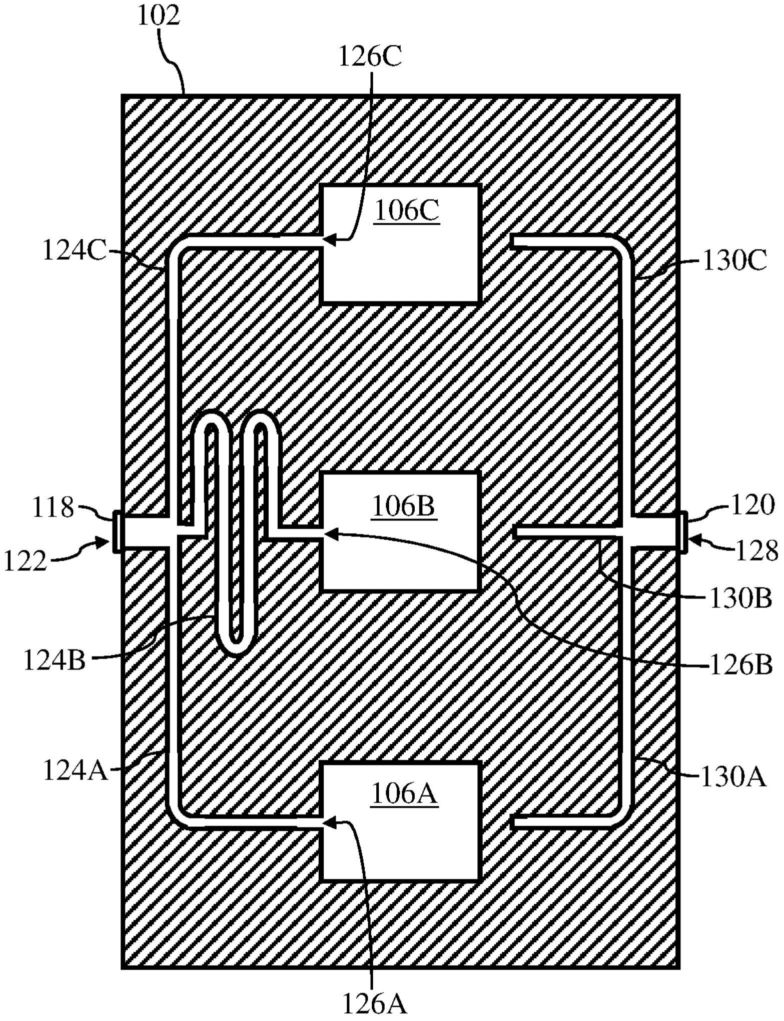
FIG. 5 shows a top cross-sectional view of the first member of the cleaning fixture of FIG. 4, taken along line 5-5, according to embodiments of the disclosure.
Figure 6:
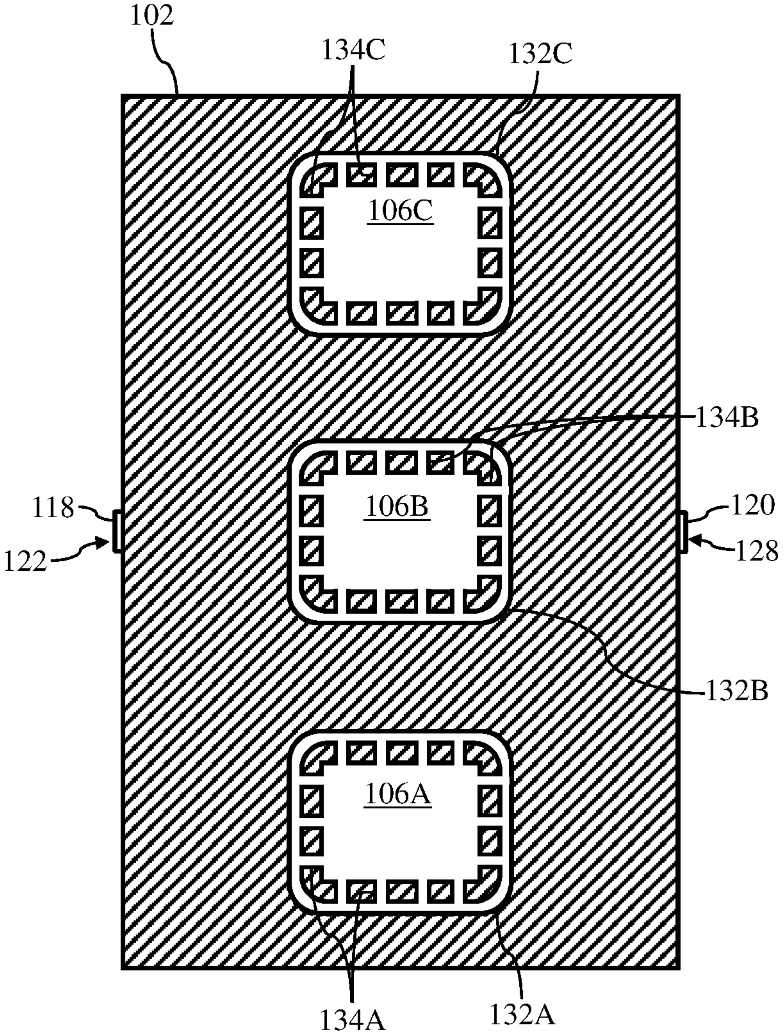
FIG. 6 shows a top cross-sectional view of the first member of the cleaning fixture of FIG. 4, taken along line 6-6, according to embodiments of the disclosure.

FIGS. 2-6 show various views of first member 102 and/or or second member 104 of cleaning fixture 100 shown in FIG. 1. Specifically, FIG. 2 shows a top view of first member 102 of cleaning fixture 100, FIG. 3 shows a cross-sectional front view of first member 102 of cleaning fixture 100, FIG. 4 shows a front view of first member 102 of cleaning fixture 100, and FIGS. 5 and 6 show distinct cross-sectional top views of first member 102 of cleaning fixture 100. It is understood that similarly numbered and/or named components may function in a substantially similar fashion. Redundant explanation of these components has been omitted for clarity.

As briefly discussed herein, first member 102 of cleaning fixture 100 may include a plurality of inlets or manifolds including solvent manifold 118. As shown in FIGS. 2-5, solvent manifold 118 may be formed in and/or through first member 102. Specifically, solvent manifold 118 may formed in and/or extend partially through first member 102 from an opening 122 formed on an exterior surface of first member 102 to distinct features (e.g., a plurality of conduits) formed in first member 102. As discussed herein, solvent manifold 118 may be configured to receive a solvent, via opening 122, and provide or fluidly communicate the solvent to the plurality of component recess 106A, 106B, 106C when performing a cleaning process on the plurality of components 10A, 10B, 10C using cleaning fixture 100 (see, FIG. 1).

As shown in FIGS. 2-6, first member 102 of cleaning fixture 100 may include a plurality of conduits in fluid communication with solvent manifold 118 and/or gas manifold 120, and the plurality of component recesses 106A, 106B, 106C, respectively. In the non-limiting examples shown FIGS. 2-5, first member 102 may include a plurality of solvent conduits 124A, 124B, 124C. The plurality of solvent conduits 124A, 124B, 124C may be formed within and/or through first member 102 of cleaning fixture 100, and may be disposed between solvent manifold 118 and the plurality of component recesses 106A, 106B, 106C. Additionally, each of the plurality of solvent conduits 124A, 124B, 124C may be in fluid communication with solvent manifold 118 and a respective component recess 106A, 106B, 106C formed in first member 102. That is, the plurality of solvent conduits 124A, 124B, 124C may be formed between and may fluidly couple solvent manifold 118 to a respective component recess 106A, 106B, 106C. In the non-limiting example shown, a first solvent conduit 124A may be in fluid communication with solvent manifold 118 and first component recess 106A, a second solvent conduit 124B may be in fluid communication with solvent manifold 118 and second component recess 106B, and a third solvent conduit 124C may be in fluid communication with solvent manifold 118 and third component recess 106C.

Each of the plurality of solvent conduits 124A, 124B, 124C may include at least one physical characteristic that may control delivery of a solvent into the corresponding component recess 106A, 106B, 106C at a desired fluid parameter. That is, each solvent conduit 124A, 124B, 124C may include physical characteristic(s) that may control, influence, and/or determine the desired fluid parameter for a solvent being delivered to a corresponding component recess 106A, 106B, 106C during the cleaning process discussed herein. The physical characteristics for the plurality of solvent conduits 124A, 124B, 124C may include, but are not limited to, a conduit length of the plurality of solvent conduits 124A, 124B, 124C, and/or a conduit width or diameter of the plurality of solvent conduits 124A, 124B, 124C. Additionally, the desired fluid parameter for the solvent being delivered by the plurality of solvent conduits 124A, 124B, 124C may include, but are not limited to, a desired flow rate of the solvent into the plurality of component recesses 106A, 106B, 106C, a desired pressure of the solvent flowing into the plurality of component recesses 106A, 106B, 106C, and/or a desired solvent exposure duration for the components 10A, 10B, 10C positioned within each of the plurality of component recesses 106A, 106B, 106C during the cleaning process discussed herein.

As discussed herein, the desired fluid parameter of the delivered solvent may be substantially equal, identical, and/or similar within each of the plurality of component recesses 106A, 106B, 106C during the cleaning process. In a non-limiting example shown in FIGS. 2 and 5, in order to achieve substantially equal desired flow rate, desired pressure, and/or desired solvent exposure duration (e.g., desired fluid parameters) within each of the plurality of component recesses 106A, 106B, 106C, each of the plurality of solvent conduits 124A, 124B, 124C may include a substantially equal length. That is, the length of first solvent conduit 124A may be substantially equal to the length of second solvent conduit 124B and third solvent conduit 124C, respectively. In a non-limiting example, the plurality of solvent conduits 124A, 124B, 124C may all be an equal length between approximately 20 centimeters (cm) and approximately 50 cm. In another non-limiting example, the plurality of solvent conduits 124A, 124B, 124C may include substantially equal lengths that may be within approximately 5% of each other. Briefly turning to FIG. 5, because second component recess 106B is closer to solvent manifold 118 than first component recess 106A and/or third component recess 106C, second component recess 106B may be formed to include a substantially wound, snaked, serpentine, coiled, and/or non-linear shape, geometry, and/or configuration to compensate for the equal length of the plurality of solvent conduits 124A, 124B, 124C. Specifically, because of the space between solvent manifold 118 and second component recess 106B is limited and/or less than the space between solvent manifold 118 and first component recess 106A/third component recess 106C, second solvent conduit 124B may be formed in first member 102 to include a substantially serpentine configuration in order to have an equal length as first solvent conduit 124A/third solvent conduit 124C. As discussed herein, controlling the desired fluid parameter for a solvent being delivered to a corresponding component recess 106A, 106B, 106C by the physical characteristics of the plurality of solvent conduits 124A, 124B, 124C may ensure that each of the plurality of components 10A, 10B, 10C positioned within cleaning fixture 100 (see, FIG. 1) may be adequately and sufficiently cleaned during the cleaning process.

Briefly turning to FIGS. 3-5, each of the plurality of solvent conduits 124A, 124B, 124C may include a solvent outlet 126A, 126B, 126C. More specifically, each of the plurality of solvent conduits 124A, 124B, 124C may be in fluid communication with a respective component recess 106A, 106B, 106C via a solvent outlet 126A, 126B, 126C. As shown in FIG. 5, solvent outlets 126A, 126B, 126C may be formed through, extend from, and/or may be in fluid communication with a respective component recess 106A, 106B, 106C. That is, first solvent outlet 126A may be formed through, extend from, and/or may be in fluid communication with first component recess 106A, second solvent outlet 126B may be formed through, extend from, and/or may be in fluid communication with second component recess 106B, and third solvent outlet 126C may be formed through, extend from, and/or may be in fluid communication with third component recess 106C. Additionally, first solvent outlet 126A may fluidly couple first solvent conduit 124A with first component recess 106A, second solvent outlet 126B may fluidly couple second solvent conduit 124B with second component recess 106B, and third solvent outlet 126C may fluidly couple third solvent conduit 124C with third component recess 106C. As discussed herein, a solvent provided by solvent manifold 118 may be delivered from the plurality of solvent conduits 124A, 124B, 124C to a corresponding component recess 106A, 106B, 106C via corresponding solvent outlet 126A, 126B, 126C during the cleaning process.

Additionally as shown in FIGS. 2-6, and as briefly discussed herein, first member 102 of cleaning fixture 100 (see, FIG. 1) may also include gas manifold 120. As shown in FIGS. 2-5, gas manifold 120 may be formed in and/or through first member 102, opposite solvent manifold 118. Specifically, gas manifold 120 may formed in and/or extend partially through first member 102 from an opening 128 formed on an exterior surface of first member 102 to distinct features (e.g., a plurality of conduits) formed in first member 102. As discussed herein, gas manifold 120 may be configured to receive a gas, via opening 128, and provide or fluidly communicate the gas to the plurality of component recess 106A, 106B, 106C when performing a cleaning process on the plurality of components 10A, 10B, 10C using cleaning fixture 100 (see, FIG. 1).

As shown in FIGS. 2-6, first member 102 may also include a plurality of gas conduits 130A, 130B, 130C. The plurality of gas conduits 130A, 130B, 130C may be formed within and/or through first member 102 of cleaning fixture 100, and may be disposed between gas manifold 120 and at least a portion of the plurality of component recesses 106A, 106B, 106C. Additionally, each of the plurality of gas conduits 130A, 130B, 130C may be in fluid communication with gas manifold 120 and a respective component recess 106A, 106B, 106C formed in first member 102. That is, the plurality of gas conduits 130A, 130B, 130C may be formed at least partially between and may fluidly couple gas manifold 120 to a respective component recess 106A, 106B, 106C. In the non-limiting example shown, a first gas conduit 130A may be in fluid communication with gas manifold 120 and first component recess 106A, a second gas conduit 130B may be in fluid communication with gas manifold 120 and second component recess 106B, and a third gas conduit 130C may be in fluid communication with gas manifold 120 and third component recess 106C. As discussed herein, each of the plurality of gas conduits 130A, 130B, 130C may be configured to deliver a (pressurized) gas received by gas manifold 120 to a respective component recess 106A, 106B, 106C of first member 102 during the cleaning process.

Turning to FIGS. 2 and 6, and with continued reference to FIGS. 3-5, the plurality of gas conduits 130A, 130B, 130C may include a component recess manifold segment 132A, 132B, 132C (hereafter, “manifold segment 132A, 132B, 132C”). That is, each of the plurality of gas conduits 130A, 130B, 130C may include a corresponding manifold segment 132A, 132B, 132C that may substantially surround a respective component recess 106A, 106B, 106C of first member 102. For example, first gas conduit 130A may include a first manifold segment 132A that may substantially surround first component recess 106A, second gas conduit 130B may include a second manifold segment 132B that may substantially surround second component recess 106B, and third gas conduit 130C may include a third manifold segment 132C that may substantially surround third component recess 106C.

Turning to FIGS. 2, 3, and 6, each of the plurality of gas conduits 130A, 130B, 130C may include a plurality of gas outlets 134A, 134B, 134C. More specifically, each of the plurality of gas conduits 130A, 130B, 130C may be in fluid communication with a respective component recess 106A, 106B, 106C via a corresponding plurality of gas outlets 134A, 134B, 134C. In the non-limiting example, the first plurality of gas outlets 134A may fluidly couple first gas conduit 130A with first component recess 106A, the second plurality of gas outlets 134B may fluidly couple second gas conduit 130B with second component recess 106B, and the third plurality of gas outlets 134C may fluidly couple third gas conduit 130C with third component recess 106C. As shown in FIGS. 2, 3, and 6, each of the plurality of gas outlets 134A, 134B, 134C may be formed through, extend from, disposed around, and/or may be in fluid communication with a respective component recess 106A, 106B, 106C. In the non-limiting example, the first plurality of gas outlets 134A may be formed through, extend from, and/or may be in fluid communication with first component recess 106A, the second plurality of gas outlets 134B may be formed through, extend from, and/or may be in fluid communication with second component recess 106B, and the third plurality of gas outlets 134C may be formed through, extend from, and/or may be in fluid communication with third component recess 106C.

Additionally, each manifold segment 132A, 132B, 132C included in corresponding gas conduits 130A, 130B, 130C may also be in fluid communication with a corresponding plurality of gas outlets 134A, 134B, 134C disposed around respective component recesses 106A, 106B, 106C. For example, the first plurality of gas outlets 134A may be in fluid communication with first manifold segment 132A of first gas conduit 130A, the second plurality of gas outlets 134B may be in fluid communication with second manifold segment 132B of second gas conduit 130B, and the third plurality of gas outlets 134C may be in fluid communication with third manifold segment 132C of third gas conduit 130C. As discussed herein, a pressurized gas provided by gas manifold 120 may be delivered from the plurality of gas conduits 130A, 130B, 130C to a corresponding component recess 106A, 106B, 106C via manifold segments 132A, 132B, 132C and corresponding plurality of gas outlets 134A, 134B, 134C during the cleaning process.

Figure 7:
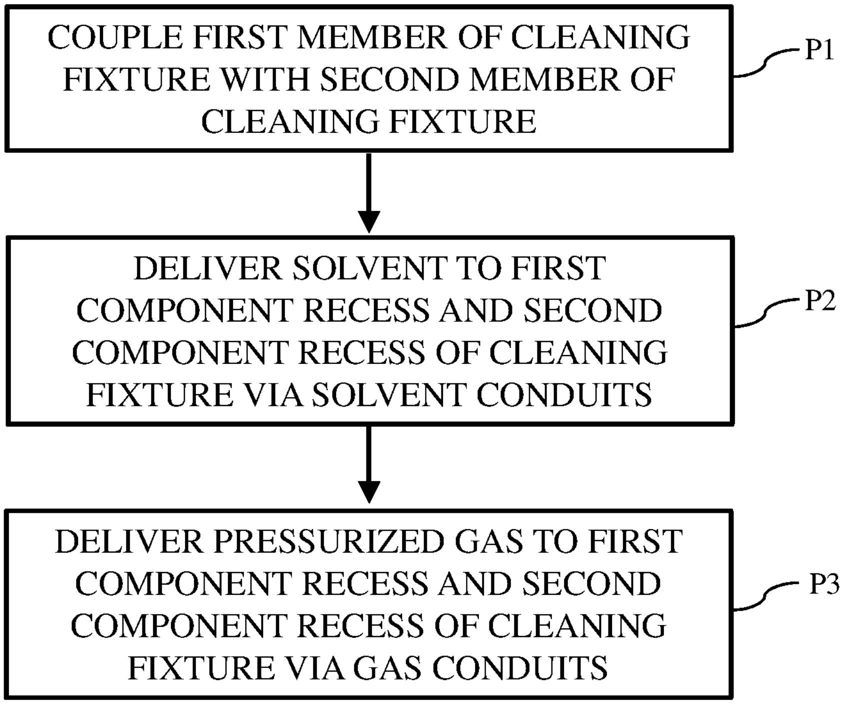
FIG. 7 shows a flow chart of an example process for cleaning a plurality of components using a cleaning fixture, according to embodiments of the disclosure.

FIG. 7 shows non-limiting example processes for cleaning at least one component using a cleaning fixture. Specifically, FIG. 7 is a flowchart depicting example processes for cleaning a plurality of components using a cleaning fixture, a solvent, and pressurized gas. In some cases, the processes may be used to clean the plurality of components 10A, 10B, 10C, as discussed herein with respect to FIG. 1, using cleaning fixture 100 discussed herein with respect to FIGS. 1-6. In other non-limiting examples, the processes may be used to clean the plurality of components 10A, 10B, 10C using cleaning fixture 100, including first member 102 and/or second member 104, discussed herein with respect to FIGS. 9-11. Although discussed herein as processes for cleaning a plurality of components using a cleaning fixture, it is understood that one or more components may be cleaned at a time using the cleaning fixture and performing the processes discussed herein.

In process P1, a first member of the cleaning fixture may be coupled to a second member of the cleaning fixture. More specifically, the first member of the cleaning fixture may be releasably coupled to the second member cleaning fixture. The first member and the second member may define a plurality of component recesses in the cleaning fixture. For example, the first member and the second member may define a first component recess and a distinct, second component recess. The first component recess may be configured to receive a first component of the plurality of components to be cleaned using the cleaning fixture, and the second component recess may be configured to receive a second component of the plurality of components. In non-limiting examples, the first member may include the plurality of component recesses, and the second member may include at least once cavity to define the component recesses and/or the chamber or pocket defined between the first member and the second member configured to receive the plurality of components. Releasably coupling the first member and the second member to define the component recesses, and/or the chamber or pocket within the cleaning fixture, may also include sealing the component recesses.

In process P2, a solvent may be delivered at a desired fluid parameter to the cleaning fixture. Specifically, the solvent may be delivered at a desired fluid parameter to the first component recess and second component recess (e.g., the plurality of component recesses) of the cleaning fixture. The solvent may be delivered to the first component recess of the cleaning fixture via a first solvent conduit in fluid communication with the first component recess, and the solvent may be delivered to the second component recess via a distinct, second solvent conduit in fluid communication with the second component recess. Delivering the solvent may also include receiving the solvent at a solvent manifold in fluid communication with the first solvent conduit and the second solvent conduit, respectively, flowing the solvent through each of the first solvent conduit and the second solvent conduit, and dispensing the solvent from a distinct solvent outlet formed into the respective component recesses. Each distinct solvent outlet may be in fluid communication with a respective solvent conduit. For example, a first solvent outlet formed into the first component recess may be in fluid communication with the first solvent conduit, and the second solvent outlet formed in the second component recess may be in fluid communication with the second solvent conduit. The solvent may be delivered to the first component recess and the second component recess, respectively, until the components formed therein are substantially submerged and/or covered with the solvent.

In order to deliver the solvent at a desired fluid parameter to the cleaning fixture, the plurality of solvent conduits of the cleaning fixture may include at least one physical characteristic that may control the delivery of the solvent. That is, the first solvent conduit and the second solvent conduit may include physical characteristic(s) that may control, and/or influence the delivery of the solvent into the first component recess and the second component recess, respectively, at the desired fluid parameter. The physical characteristics for the first solvent conduit and the second solvent conduit may include, but are not limited to, a conduit length of the first solvent conduit and the second solvent conduit, and/or a conduit width or diameter of the first solvent conduit and the second solvent conduit. Additionally, the desired fluid parameter for the solvent being delivered by the first solvent conduit and the second solvent conduit to the respective component recesses may include, but are not limited to, a desired flow rate of the solvent into the component recesses, a desired pressure of the solvent flowing into the component recesses, and/or a desired solvent exposure duration for the components positioned within each of the component recesses. Controlling the desired fluid parameter for a solvent being delivered to the component recesses by the physical characteristics of the solvent conduits may ensure that each of the components positioned within the cleaning fixture 100 may be adequately and sufficiently exposed to and/or submerged in the solvent.

In process P3, a pressurized gas is delivered to the cleaning fixture. That is, the pressurized gas may be delivered to the first component recess and second component recess (e.g., the plurality of component recesses) of the cleaning fixture. The pressurized gas may be delivered to the first component recess of the cleaning fixture via a first gas conduit in fluid communication with the first component recess, and the pressurized gas may be delivered to the second component recess via a distinct, second gas conduit in fluid communication with the second component recess. Delivering the pressurized gas may also include receiving the pressurized gas at a gas manifold in fluid communication with the first gas conduit and the second gas conduit, respectively, flowing the pressurized gas through each of the first gas conduit and the second gas conduit, and dispensing the pressurized gas from a plurality of gas outlets formed into the respective component recesses. Each distinct plurality of gas outlets may be in fluid communication with a respective gas conduit. For example, a first plurality of gas outlets formed into the first component recess may be in fluid communication with the first gas conduit, and the second plurality of gas outlets formed in the second component recess may be in fluid communication with the second gas conduit. Additionally, each of the plurality of gas outlets formed into the respective component recesses may be disposed around the respective component recess, and as a result, may substantially surround each component positioned within the respective component recess.

Delivering the pressurized gas to the first component recess and second component recess of the cleaning fixture may also include forming gas bubbles within the delivered solvent in the respective component recesses. That is, delivering the pressurized gas from the plurality of the gas outlets to the respective component recesses may including forming gas bubbles from the pressurized gas with the solvent delivered to the respective component recesses that may substantially surround the component positioned therein. Additionally, delivering the pressurized gas, and more specifically forming gas bubbles within the solvent in the respective component recess, may also include agitating the delivered solvent directly surrounding the respective components, and/or impacting a surface of the respective components with the formed gas bubbles. Agitating the delivered solvent surround the respective components in the component recesses and/or impacting the respective components with the formed gas bubbles may substantially vibrate the respective components positioned within the cleaning fixture. Vibrating the components positioned within the respective component recesses may ensure that the delivered solvent, substantially filling the component recesses, may contact, pass over, and/or flow through all portions of the components. This may ultimately clean the component and/or may remove any remaining build material/debris remaining on the component after the component is built using additive manufacturing processes discussed herein.

Although discussed and shown in sequential order, it is understood that the various processes discussed herein for cleaning components using a cleaning fixture may be performed in distinct order and/or may include processes that are performed simultaneously. For example, process P3 (e.g., delivering a pressured gas) may be performed simultaneously to process P2 (e.g., delivering a solvent), such that the plurality of component recesses of the cleaning fixture are receiving both solvent and pressurized gas at the same time during the cleaning process. In another non-limiting example, process P3 may be performed subsequent to the start of process P2, but while process P2 is still being performed. That is, the plurality of component recesses of the cleaning fixture may initially receive a portion of the solvent (e.g., process P2) before receiving the pressurized gas (e.g., process P2). In this example, once a predetermined amount (e.g., less than the total amount) of solvent is received within the plurality of component recesses, the component recesses may then begin to receive the pressurized gas. In an additional non-limiting example, the solvent may first be completely delivered (e.g., process P2) to the plurality of component recesses of the cleaning fixture, and subsequently, the pressurized gas may be delivered (e.g., process P3) to the plurality of component recesses including the delivered solvent.

Figure 8:
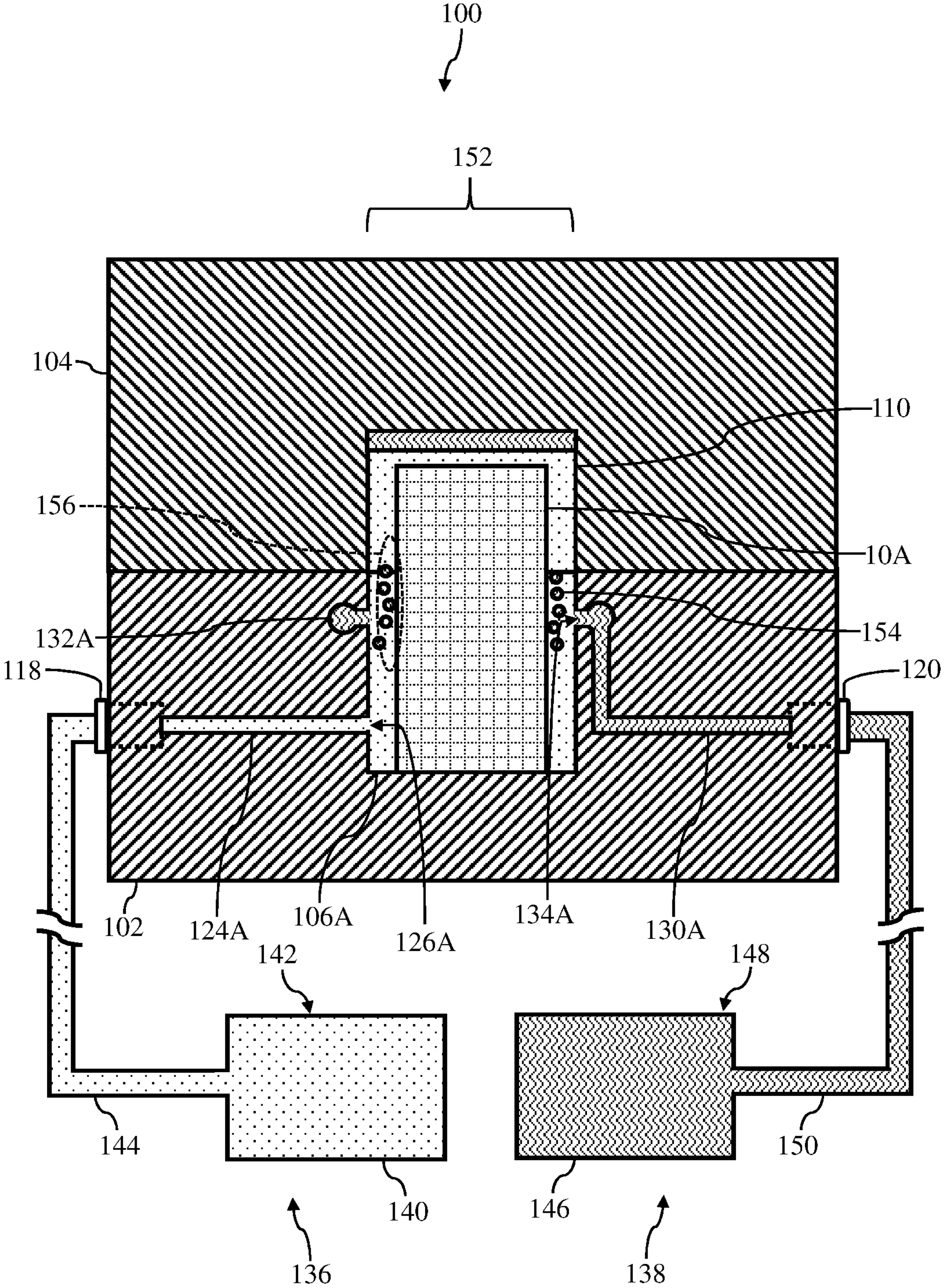
FIG. 8 shows a front cross-sectional view of the cleaning fixture and a component of FIG. 1, taken along line 8-8, according to embodiments of the disclosure.

Turning to FIG. 8, a cross-sectional front view of cleaning fixture 100 and component 10A of FIG. 1, a solvent supply system 136, and a gas supply system 138 are shown. Each of the solvent supply system 136 and gas supply system 138 may be fluidly coupled with and/or in fluid communication with cleaning fixture 100. That is, solvent supply system 136 may include a solvent reservoir 140 containing solvent 142, and a solvent delivery channel 144 positioned between and in fluid communication with solvent reservoir 140 and solvent manifold 118 formed in first member 102 of cleaning fixture 100. Additionally, gas supply system 138 may include a gas reservoir 146 containing gas 148, and a gas delivery channel 150 positioned between and in fluid communication with gas reservoir 146 and gas manifold 120 formed in first member 102 of cleaning fixture 100.

Solvent 142 positioned within solvent reservoir 140, and supplied to cleaning fixture 100 during the cleaning process may be any suitable solvent that may clean the plurality of components 10A, 10B, 10C (component 10A shown) positioned within cleaning fixture 100. In non-limiting examples, the material composition of solvent 142 may be dependent, at least in part, on the material and/or the additive manufacturing process used to form the plurality of components 10A, 10B, 10C. Additionally, gas 148 contained within gas reservoir 146 and supplied to cleaning fixture 100 may be any suitable gas that may form bubbles within solvent 142 during the cleaning process discussed herein. Furthermore, and as discussed herein, gas 148 may be pressurized gas. In non-limiting examples, gas 148 may be pressurized prior to being supplied to cleaning fixture 100 using a pressurization component (e.g., blower, nozzle) (not shown) included within gas supply system 138, and/or may be pressurized within cleaning fixture 100. That is, gas manifold 120, the plurality of gas conduits 130A, 130B, 130C, manifold segment 132A, 132B, 132C, and/or the plurality of gas outlets 134A, 134B, 134C may include additional features (e.g., nozzles, restricted diameters) and/or may be configured to pressurize gas 148 prior to gas 148 being delivered to the respective component recesses 106A, 106B, 106C.

A non-limiting example process of cleaning the plurality of components 10A, 10B, 10C using cleaning fixture 100 may now be discussed with respect to FIG. 8. Although the non-limiting example for cleaning discussed herein with respect to FIG. 8 may only discuss and depict a first component 10A, it is understood that the distinct components 10B, 10C may undergo similar processes and/or may be cleaned in a similar manner. Additionally, it is understood that similarly numbered and/or named components may function in a substantially similar fashion. Redundant explanation of these components has been omitted for clarity.

As shown in FIG. 8, first member 102 and second member 104 of cleaning fixture 100 may be releasably coupled and may receive, contain and/or house component 10A. Specifically, first member 102 and second member 104 of cleaning fixture 100 may be releasably coupled and component 10A may be positioned within first component recess 106A of first member 102 and cavity 110 of second member 104, respectively. Releasably coupling first member 102 and second member 104, and the formation of first component recess 106A and cavity 100 therein may form sealed chamber 152, that may receive and/or house component 10A and fluidly seal first component recess 106A from leaking solvent 142. Releasably coupling first member 102 and second member 104 of cleaning fixture 100, as shown in FIG. 8, may be substantially similar to process P1 discussed herein with respect to FIG. 7.

Once releasably coupled, solvent supply system 136 may deliver solvent 142 to cleaning fixture 100. Specifically, solvent supply system 136 may deliver solvent 142 to first component recess 106A formed in first member 102 of cleaning fixture 100. As shown in FIG. 8, and as discussed herein, solvent 142 may be supplied to first component recess 106A by flowing from solvent delivery channel 144 of solvent supply system 136 to solvent manifold 118, from solvent manifold 118 to first solvent conduit 124A, and finally from solvent conduit 124A to first component recess 106A, via first solvent outlet 126A. Solvent 142 may be delivered and/or flow to first component recess 106A until first component 10A positioned therein is substantially covered and/or submerged in solvent 142. Additionally when being delivered, solvent 142 may flow over all exposed surfaces of component 10A, and where applicable, solvent 142 may also flow into complex geometries and/or channels formed in or through component 10A. As discussed herein, solvent 142 may be delivered at desired fluid parameter(s) (e.g., desired flow rate, desired pressure, and/or desired solvent exposure duration) to first recess component 106A including first component 10A based on the physical characteristic(s) of first solvent conduit 124A (e.g., conduit length, conduit width or diameter). Delivering solvent 142 to first component recess 106A including first component 10A may be substantially similar to process P2 discussed herein with respect to FIG. 7.

Simultaneously, or subsequent to, delivering solvent 142 to first component recess 106A, pressurized gas 148 may be delivered to first component recess 106A. Specifically, gas supply system 138 may deliver pressurized gas 148 to first component recess 106A formed in first member 102 of cleaning fixture 100. As shown in FIG. 8, and as discussed herein, pressurized gas 148 may be supplied to first component recess 106A by flowing from gas delivery channel 150 to gas manifold 120, from gas manifold 120 to first gas conduit 130A, and finally from manifold segment 132A of first gas conduit 130A to first component recess 106A, via the first plurality of gas outlets 134A. Delivering the pressurized gas to first component recess 106A may include forming gas bubbles 154 within solvent 142 delivered to first component recess 106A and substantially surrounding or covering first component 10A. As shown in FIG. 8, gas bubbles 154 formed from pressurized gas 148 may agitate solvent 142 directly surrounding first component 10A (e.g., phantom area 156). Additionally, or alternatively, gas bubbles 154 may impact a surface of first component 10A. As discussed herein, agitating the delivered solvent 142 surround first component 10A in first component recess 106A and/or impacting first component 10A with gas bubbles 154 may substantially vibrate first component 10A positioned within cleaning fixture 100. Vibrating first component 106A when being exposed to and/or submerged in solvent 142 may ensure that solvent 142 may contact, continuously pass over, and/or flow through all portions or features (e.g., complex geometries, channels) of first component 10A. The continuous exposure and/or movement of solvent 142 over and/or through first component 10A may ultimately clean first component 10A by removing any remaining build material/debris remaining on first component 10A after preforming the additive manufacturing processes discussed herein. Delivering pressurized gas 148 to first component recess 106A including first component 10A, as shown in FIG. 8, may be substantially similar to process P3 discussed herein with respect to FIG. 7.

Figure 9:
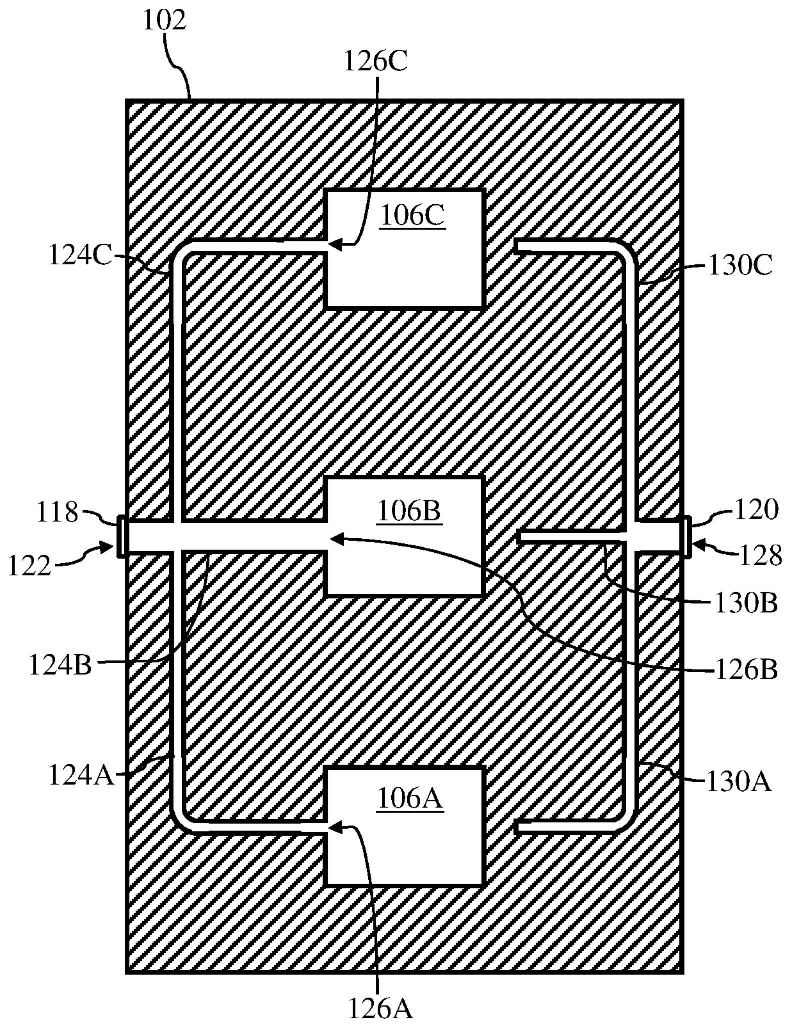
FIG. 9 shows a top cross-sectional view of a first member of the cleaning fixture of FIG. 1, according to another embodiment of the disclosure.

FIG. 9 shows a cross-sectional top view of another non-limiting example of first member 102 of cleaning fixture 100. Compared to the non-limiting example shown in FIGS. 2-6, the plurality of solvent conduits 124A, 124B, 124C of first member 102 shown in FIG. 9 may include unique and/or distinct physical characteristics. Specifically in the non-limiting example, at least two of the plurality of solvent conduits 124A, 124B, 124C may include distinct lengths. That is, second solvent conduit 124B may include a length that is shorter or smaller than the length of first solvent conduit 124A and third solvent conduit 124C, respectively. As discussed herein, the desired fluid parameter of the delivered solvent 142 may be substantially equal, identical, and/or similar within each of the plurality of component recesses 106A, 106B, 106C during the cleaning process. In the non-limiting example of FIG. 9, in order to achieve substantially equal desired flow rate, desired pressure, and/or desired solvent exposure duration (e.g., desired fluid parameters) within each of the plurality of component recesses 106A, 106B, 106C, each of the plurality of solvent conduits 124A, 124B, 124C may include distinct widths or diameters. That is, where the lengths of at least two of the plurality of solvent conduits 124A, 124B, 124C are distinct, at least two of the plurality of solvent conduits 124A, 124B, 124C may include distinct widths or diameters. As shown in FIG. 9, because the length of second solvent conduit 124B is shorter than the length of first solvent conduit 124A and third solvent conduit 124C, the width or diameter of second solvent conduit 124B may be larger or greater than the width or diameter of first solvent conduit 124A and third solvent conduit 124C, respectively.

In other non-limiting examples (not shown) the plurality of solvent conduits 124A, 124B, 124C may include additional physical characteristics that may control the desired fluid parameter for solvent 142 being delivered to a corresponding component recess 106A, 106B, 106C, as discussed herein. For example, at least one of the plurality of solvent conduits 124A, 124B, 124C may include a nozzle formed therein (e.g., at solvent outlets 126A, 126B, 126C) to control the flow rate, the pressure, and/or the solvent exposure duration during the cleaning process. That is, at least one of the plurality of solvent conduits 124A, 124B, 124C may include a nozzle that may be configured to modify the flow rate, and/or the pressure of solvent 142 flowing to component recesses 106A, 106B, 106C. Additionally, or alternatively, the nozzle(s) included within the plurality of solvent conduits 124A, 124B, 124C may be shut off to stop the flow of solvent 142 into the component recesses 106A, 106B, 106C to control the solvent exposure duration during the cleaning process discussed herein.

Figure 10A:
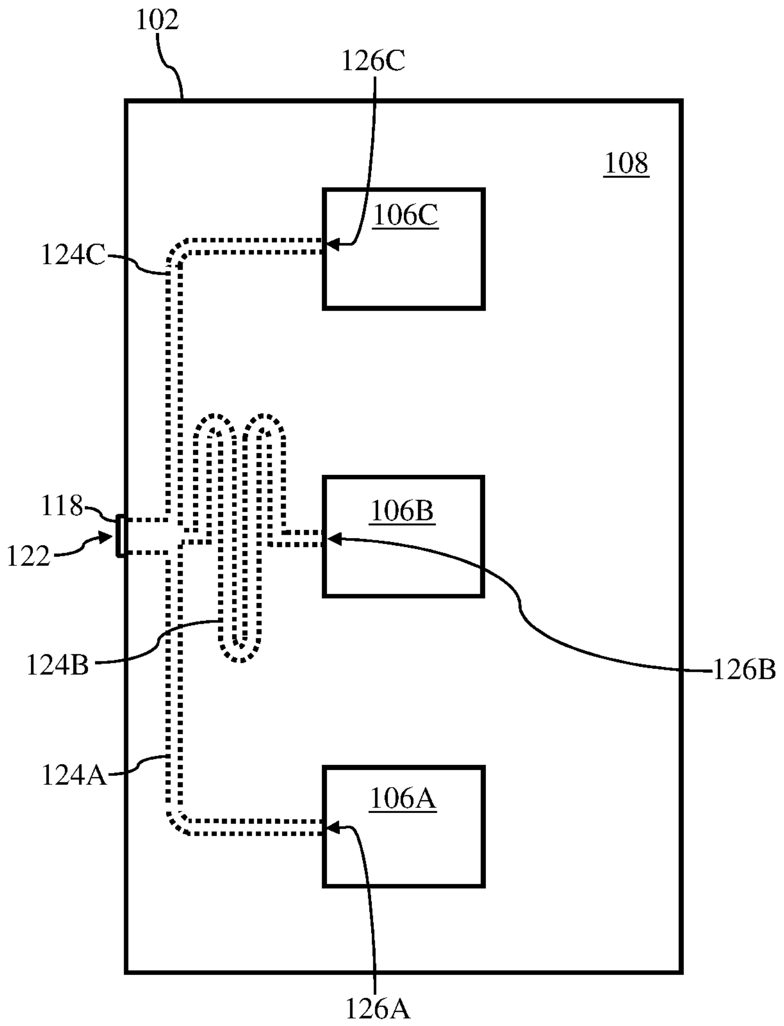
FIG. 10A shows a top view of a first member of a cleaning fixture, according to additional embodiments of the disclosure.
Figure 10B:
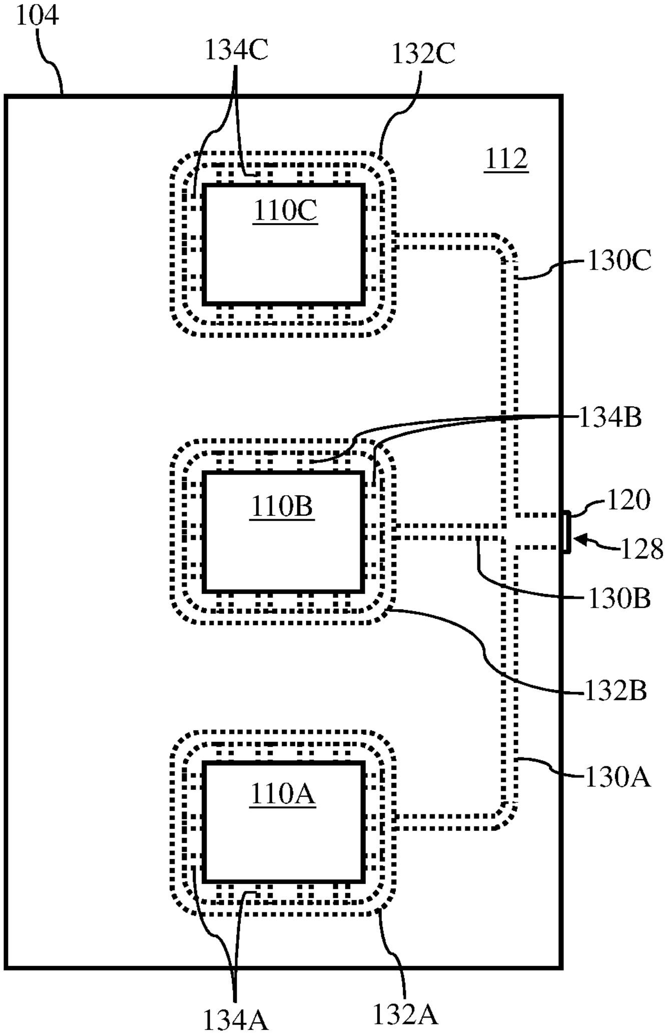
FIG. 10B shows a bottom view of a second member of a cleaning fixture utilized with the first member of FIG. 10A, according to additional embodiments of the disclosure.
Figure 11:
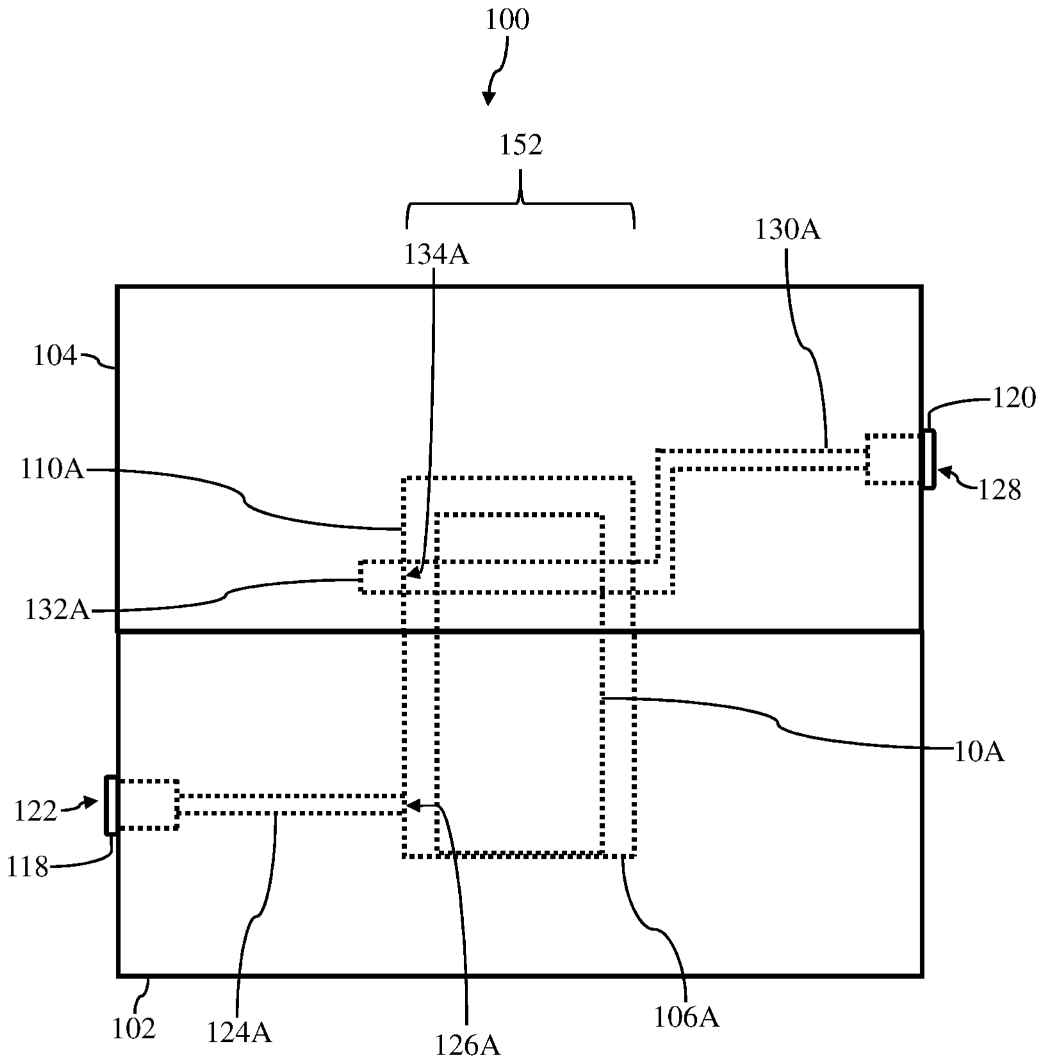
FIG. 11 shows a front view of a component and a cleaning fixture including the first member of FIG. 10A and the second member of FIG. 10B, according to additional embodiments of the disclosure.

FIGS. 10A-11 show various views of another non-limiting example of cleaning fixture 100. Specifically, FIG. 10A shows a top view of first member 102 of cleaning fixture 100, FIG. 10B shows a bottom view of second member 104 of cleaning fixture 100, and FIG. 11 shows a front view of a first component 10A, and first member 102 of FIG. 10A and second member 104 of FIG. 10B releasably coupled. It is understood that similarly numbered and/or named components may function in a substantially similar fashion. Redundant explanation of these components has been omitted for clarity.

Similar to cleaning fixture 100 discussed herein with respect to FIGS. 1-6, cleaning fixture 100 shown in FIGS. 10A-11 may include a plurality of conduits in fluid communication with solvent manifold 118 and/or gas manifold 120, and the plurality of component recesses 106A, 106B, 106C, respectively. However, distinct from cleaning fixture 100 of FIGS. 1-6, some of the plurality of conduits, and gas manifold 120 may be positioned on different portions of cleaning fixture 100. For example, and as shown in FIG. 10A, first member 102 of cleaning fixture may only include solvent manifold 118, the plurality of solvent conduits 124A, 124B, 124C, and the plurality of solvent outlets 126A, 126B, 126C formed through and/or into the respective component recess 106A, 106B, 106C. As shown in FIG. 10B, second member 104 may include the remaining portions or features of cleaning fixture 100. That is, and as shown in FIG. 10B, second member 104 of cleaning fixture 100 may include gas manifold 120, the plurality of gas conduits 130A, 130B, 130C, manifold segments 132A, 132B, 132C, and the respective, plurality of gas outlets 134A, 134B, 134C. Briefly turning to FIG. 11, the respective, plurality of gas outlets 134A, 134B, 134C, formed through and/or into a corresponding cavity 110A, 110B, 110C of second member 104 as discussed herein, may substantially surround the respective component 10A, 10B, 10C (first component 10A shown in phantom) received by the component recesses 106A, 106B, 106C formed in first member 102.

Also distinct from cleaning fixture 100 discussed herein with respect to FIG. 1, second member 104 of cleaning fixture 100 shown in FIG. 10B may include a plurality of distinct cavities 110A, 110B, 110C. Each of the plurality of cavities 110A, 110B, 110C may formed in and/or partially through bottom surface 112, and configured to receive at least a portion of the plurality of components 10A, 10B, 10C. The plurality of cavities 110A, 110B, 110C of second member 104 may be substantially aligned with and/or may substantially cover each of the plurality of component recesses 106A, 106B, 106C. When first member 102 and second member 104 are releasably coupled, each of the plurality of component recesses 106A, 106B, 106C of first member 102 and the corresponding cavity 110A, 110B, 110C of second member 104 may form an individual, sealed chamber (see, FIG. 8), as discussed herein.

The technical effect is to provide a cleaning fixture for additive manufactured components, and cleaning processes using the cleaning fixture that may improve the removal of excess material from the components prior to use of the components and/or prior to performing post-build processes on the components.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s). As used herein, "approximately" indicates +/−10% of the value, or if a range, of the values stated.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A cleaning fixture for at least one component, the cleaning fixture comprising:

a first component recess configured to receive a first component therein and a second component recess configured to receive a second component therein, each component recess defined between a first member and a mating second member of the cleaning fixture;

a first solvent conduit in fluid communication with the first component recess, and a second solvent conduit in fluid communication with the second component recess, the first solvent conduit and the second solvent conduit each including a physical characteristic configured to control delivery of a solvent into the respective component recess at a desired fluid parameter; and a first gas conduit in fluid communication with the first component recess, and a second gas conduit in fluid communication with the second component recess, each of the first gas conduit and the second gas conduit configured to deliver a respective pressurized gas to the respective component recess, wherein each of the first gas conduit and the second gas conduit include a plurality of gas outlets extending from and in fluid communication with the respective component recess, and wherein each of the first gas conduit and the second gas conduit include a component recess manifold segment surrounding the respective component recess, the component recess manifold segment in fluid communication with each of the plurality of gas outlets.

2. The cleaning fixture of claim 1, further comprising a solvent manifold for fluidly communicating the solvent to each of the first solvent conduit and second solvent conduit.

3. The cleaning fixture of claim 1, wherein each of the first solvent conduit and the second solvent conduit include a solvent outlet extending from and in fluid communication with the respective component recess.

4. The cleaning fixture of claim 1, wherein the plurality of gas outlets of the first gas conduit are disposed around the first component recess, and the plurality of gas outlets of the second gas conduit are disposed around the second component recess.

5. The cleaning fixture of claim 1, wherein the physical characteristic of the first solvent conduit and the second conduit includes at least one of:

a conduit length, or a conduit width.

6. The cleaning fixture of claim 5, wherein each of the first solvent conduit and the second solvent conduit include an equal length.

7. The cleaning fixture of claim 5, wherein each of the first solvent conduit and the second solvent conduit include a distinct width.

8. The cleaning fixture of claim 1, wherein the desired fluid parameter of the delivered solvent includes at least one of:

a desired flow rate, a desired pressure, or a desired solvent exposure duration.

* * * * *